United States Patent
Jones

(10) Patent No.: US 7,192,375 B2
(45) Date of Patent: Mar. 20, 2007

(54) DEVICE FOR VARYING THE TORQUE ABOUT A CENTRAL MEMBER AND METHOD OF USE

(75) Inventor: Dan Jones, Valley Mills, TX (US)

(73) Assignee: EPI - Energy, Ltd., Valley Mills, TX (US)

(*) Notice: Subject to any disclaimer, the term of this patent is extended or adjusted under 35 U.S.C. 154(b) by 184 days.

(21) Appl. No.: 10/945,529

(22) Filed: Sep. 20, 2004

(65) Prior Publication Data

US 2006/0063631 A1  Mar. 23, 2006

(51) Int. Cl.
  *F16H 1/32* (2006.01)
(52) U.S. Cl. .................. 475/179; 475/162; 475/170; 74/640
(58) Field of Classification Search ......... 475/162, 475/163, 165, 166, 169, 170, 178, 179; 74/640
See application file for complete search history.

(56) References Cited

U.S. PATENT DOCUMENTS

| | | |
|---|---|---|
| 81,329 A | 8/1868 | Barden |
| 107,432 A | 9/1870 | Zeigler |
| 850,597 A | 4/1907 | McCanna |
| 955,458 A | 4/1910 | Hampton |
| 1,141,626 A | 6/1915 | Granville |
| 1,270,950 A | 7/1918 | Johanson |
| 1,538,008 A | 5/1925 | Sharkey |
| 1,538,328 A | 5/1925 | Holdener |
| 1,770,016 A | 7/1930 | Ruliancich |
| 1,833,993 A | 12/1931 | Hill |
| 2,475,504 A | 7/1949 | Jackson |
| 3,037,400 A | 6/1962 | Sundt |
| 3,043,164 A | 7/1962 | Sundt |
| 3,668,947 A | 6/1972 | Waldorf |
| 4,099,427 A | 7/1978 | Fickelscher |
| 4,193,324 A | 3/1980 | Marc |
| 4,227,422 A | 10/1980 | Kawashima |
| 4,898,065 A * | 2/1990 | Ogata et al. ............. 475/179 |
| 4,908,102 A * | 3/1990 | Zag et al. ............... 162/264 |
| 5,292,289 A | 3/1994 | Ogata |
| 5,324,240 A | 6/1994 | Guttinger |
| 5,655,985 A * | 8/1997 | Herstek ................ 475/179 |
| 5,697,868 A | 12/1997 | Akeel |
| 6,220,115 B1 | 4/2001 | Him |
| 6,280,359 B1 | 8/2001 | Moskob |
| 6,336,881 B1 | 1/2002 | Rapp |
| 6,416,438 B1* | 7/2002 | Choi et al. ............. 475/170 |

(Continued)

OTHER PUBLICATIONS

U.S. Appl. No. 10/869,303, filed Jun. 16, 2004, Jones.

(Continued)

*Primary Examiner*—David D. Le
(74) *Attorney, Agent, or Firm*—Marcus W. Hammack

(57) ABSTRACT

A device for increasing torque about a central member as a series of driver discs eccentrically rotate about a central shaft input member and alternatingly engage an output component via a low-friction, rolling engagement mechanism. Each disc is engaged with the other through a series of rings and dowels partially embedded within each disc. As the central input shaft rotates, each disc alternatingly engages the output component so the output, and central member, rotate with increased torque, albeit at a reduced speed.

11 Claims, 2 Drawing Sheets

U.S. PATENT DOCUMENTS

| | | |
|---|---|---|
| 6,428,437 B1 | 8/2002 | Schlanger |
| 6,453,772 B1 | 9/2002 | Moskob |
| 6,490,941 B1 | 12/2002 | Hur |
| 2004/0198543 A1* | 10/2004 | Christ ........................ 475/163 |

OTHER PUBLICATIONS

Sumitomo Machinery Corporation of America, A Unique Concept in Speed Reducers & Gearmotors, 2002, United States.

* cited by examiner

DEVICE FOR VARYING THE TORQUE ABOUT A CENTRAL MEMBER AND METHOD OF USE

BACKGROUND OF THE INVENTION

1. Field of the Invention

The present invention generally relates to a device for varying the torque about a central member. In particular, the present invention relates to a device for varying the torque about a central member where the device receives the member through a central aperture. Torque is increased about the member through a series of eccentrically rotating discs engaged with one another though a combination of dowelels and rings, acting in concert to provide for an extremely efficient, exceptionally powerful system.

2. Background Information

Applicant's invention is envisioned as being useful in any number of situations where a variation in torque is needed between an input component and an output component. That is, the present device is thought to be beneficial where varied torque is needed to thread pieces of pipe together, to drive heavy machinery, or change speeds of a driven device.

Perhaps the most easily seen, and certainly one of the most beneficial, applications of the present device is found in connecting and disconnecting oil well stem segments. The drill stem segment connection and disconnection process is one of the most common procedures performed before, during, and after oil well operation. Initially, a drill stem often slides through a well bore relatively effortlessly, however, once the segment needs to be connected to, or disconnected from, another piece (by threading segments together, or unthreading the segments from on another)—the process becomes much more arduous. Often, the procedure is performed by one or more workers, who are required to walk large tongs around the well bore, or are forced to manipulate large bulky and dangerous equipment. Currently available tools and methods are subject to limitations and problems obviated by Applicant's invention. Specifically, products known in the art are much less efficient, less powerful, are cumbersome, and are dangerous in view of the present invention.

Often, "power tongs" are used to connect or disconnect drill stem segments. When these tongs are used, workers are required to "walk the tongs" around the well bore. This procedure is extremely inefficient as a large amount of working space is required. For instance, in order to achieve a linear increase in torque about the drill stem segment, the length of the tong must also increase linearly. Accordingly, proficient tongs are often on the order of four meters in length, or more-requiring a working space of more than fifty square meters! Moreover, such an arrangement prevents workers from working in close proximity with the well bore, so workers are further hindered from dealing with problems as they arise at or near the well head. Such a large working space is not only inefficient, but dangerous, as workers are forced within close proximity with other operation equipment. Moreover, unlike Applicant's invention, these tools are only capable of a single stage gear reduction. In view of its limitations, power tongs are simply outmoded in view of the present device.

Other tools used in the drill stem connection and disconnection process involve mechanically driven equipment; however, use of this equipment is also inefficient and dangerous. For instance, workers are forced to manually place and secure the equipment on the drill stem segment at the well head. The equipment is often dangerously heavy and bulky and extremely hard to manipulate. As such is the case, use of the equipment usually requires more than one worker. Moreover, the process of securing the equipment to the drill stem segment is tedious and time consuming.

Applicant's invention provides a refreshing solution to the most common problems associated with connecting and disconnecting drill stem segments. In fact, the device of the present invention eliminates the use of tongs or heavy machinery. Rather, the torque required to connect and disconnect drill stem segments is achieved though a series of eccentrically rotating discs, "driver discs." These discs are driven by a central shaft member and alternatingly engage an output component, which rotates with reduced speed and increased torque. Operation of the device may involve an increase in torque or no increase in torque. This result is achieved by modifying the rotational velocity of a variable member with respect to the driver disc. When the variable member is grounded, torque is increased about the output component and therefore the drill stem.

First and foremost, the present device presents a tremendous increase in working efficiency. As mentioned, operation of the device involves a series of discs, centrally and axially aligned with the well head, rotating about the well head. The device easily secures to the well head and requires no further movement during the entire process. As such, the only moving pieces in the work space are the drill stem segments themselves.

Applicant's device is very compact, yet tremendously powerful. The device achieves an amount of torque previously not possible in such a small space. As a result, workers are free to work in close proximity of the well head and are afforded ample space to carry out their duties. With use of the present device, a super-linear increase in torque is achieved with only a linear increase in size. That is, torque increases with the square of the radius of the device. Multiple stage reductions can also be achieved simply by stacking multiple plates on one another. As such, there is no necessary increase in device surface area.

In addition, the device of the present invention is mechanically efficient. Through use of only "rolling" components, sliding friction is virtually eliminated. As these rolling components are symmetrically aligned, and are simultaneously in contact with one another, sheer or "shock" forces are distributed evenly among the component pieces. These attributes, alone and in combination, greatly reduce operating energy, heat production, and wear and tear. Finally, operating life of the device is increased by virtue of the efficient rotation interface between the central shaft member and driver discs, and the output component.

Applicant's invention is extremely cost effective. Because of the mechanically efficient nature of, and the even distribution of sheer forces within, the system component pieces can be made of standard grade materials. Also, the current device is the product of a straightforward manufacturing process. The manufacturing cost associated with the present device is on the order of a thousand dollars, which represents a tremendous saving in view of the tens of thousands of dollars spent on heavy machinery. Finally, as will be further discussed, the primary components of the present device are laminated. This characteristic allows for a much cheaper and faster production process.

In view of the limitations of known products, there is a great need for an improved drill stem connection and disconnection device that is compact, powerful, friction-free, durable, mechanically efficient, and cost-effective. Applicant's invention, by its novel design and straightforward manufacture process, provides an improvement in view of currently available products.

SUMMARY OF THE INVENTION

In view of the foregoing, it is an object of the present invention to provide a device for varying the torque about a central member that is safe during operation, and establishes a safe working environment.

It is another object of the present invention to provide a device for varying the torque about a central member that is very compact.

It is another object of the present invention to provide a device for varying the torque about a central member that is tremendously powerful.

It is another object of the present invention to provide a device for varying the torque about a central member that produces double or triple speed reductions inexpensively.

It is another object of the present invention to provide a device for varying the torque about a central member that has an excellent power to weight ratio.

It is another object of the present invention to provide a device for varying the torque about a central member that is exceptionally mechanically efficient.

It is another object of the present invention to provide a device for varying the torque about a central member that is highly cost-effective.

It is another object of the present invention to provide a device for varying the torque about a central member that is extremely durable.

It is another object of the present invention to provide a device for varying the torque about a central member having a straightforward manufacturing process.

It is another object of the present invention to provide a device for varying the torque about a central member that can withstand extreme lateral or sheer forces.

It is yet another object of the present invention to provide a device for varying the torque about a central member that has exceptionally low internal friction.

In satisfaction of these and other related objectives, Applicant's present invention provides a device for varying the torque about a central member. Operation of the device commences as a central shaft, or input component, is driven by some outside power source. A member is received at a central aperture within the device. The central aperture is primarily defined by the inner circumference of the central shaft. Along its outer circumference, the central shaft member is characterized by a series of axially aligned, centrally offset eccentric lobes. Surrounding the central shaft member is a series of driver discs. Each driver disc is engaged with a corresponding eccentric lobe so that as the central shaft rotates, each driver disc sweeps out eccentric rings about the input member. These driver discs are also engaged with one another through some engagement means, so that each disc rotates in relation to the other.

These driver discs engage an output component, which is comprised of a series of radial output shells and a top surface. The top surface is aligned with, and covers the output shells, the driver discs, and the central shaft. However, the top surface is rotationally bound only to the output shells, so that the top surface and the output shells share the same rotational velocity.

A variable speed disc is engaged with both a driver disc and a grounding plate. This variable speed disc primarily determines whether the output component rotates with the input component, or rotates slower than, but with increased torque relative to the input component. Specifically, if the variable disc is held fixed to the surrounding environment and grounding plate, each driver disc sweeps out eccentric rings about the circumference of the input component. In this case, each driver disc alternatingly engages the output component, and "pushes" the output component so that it rotates at a reduced speed, and with increased torque. However, when the variable disc is not held fixed to the surrounding environment, it shares the rotational velocity of the central member. As a result, each driver disc is also free to rotate with the central member, sharing the same velocity as the central member and the variable disc. Finally, in this configuration, the input component and output component rotate with uniform velocity.

The grounding plate is held stationary with respect to the surrounding environment, and is primarily responsible for securing the device in a fixed location. The grounding plate is engaged with the central member and the variable member so that the variable disc member and central shaft member freely rotate with respect to the grounding plate.

In varying the torque about a member, a clamping means engages the member, extending though the central aperture, along the top surface. Specifically, the clamping means mates with the top surface through a series of pins or other suitable means so that the clamping means and output component share the same rotational velocity. As the clamping means is driven by the output component and holds the member fixed with respect to itself, the member is driven by the output component with the same torque and rotational velocity as the output component.

In the preferred embodiment, the primary components of the device are laminated. That is, each component is comprised of a series of relatively thin pieces of source material. These pieces are cut individually and then sandwiched together to form the final primary components. Production by way of lamination greatly reduces production costs and increases production speed. Specifically, it is much easier and cheaper to cut several thin pieces and fit them together, rather than cutting a single thick piece to form a single component. Perhaps cutting several thin pieces and fitting them together to form a single component, rather than cutting a single piece, may appear to be a subtle distinction at first glance. However, the enormous energy and cost saved during the production process strongly indicated the novelty of this process.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
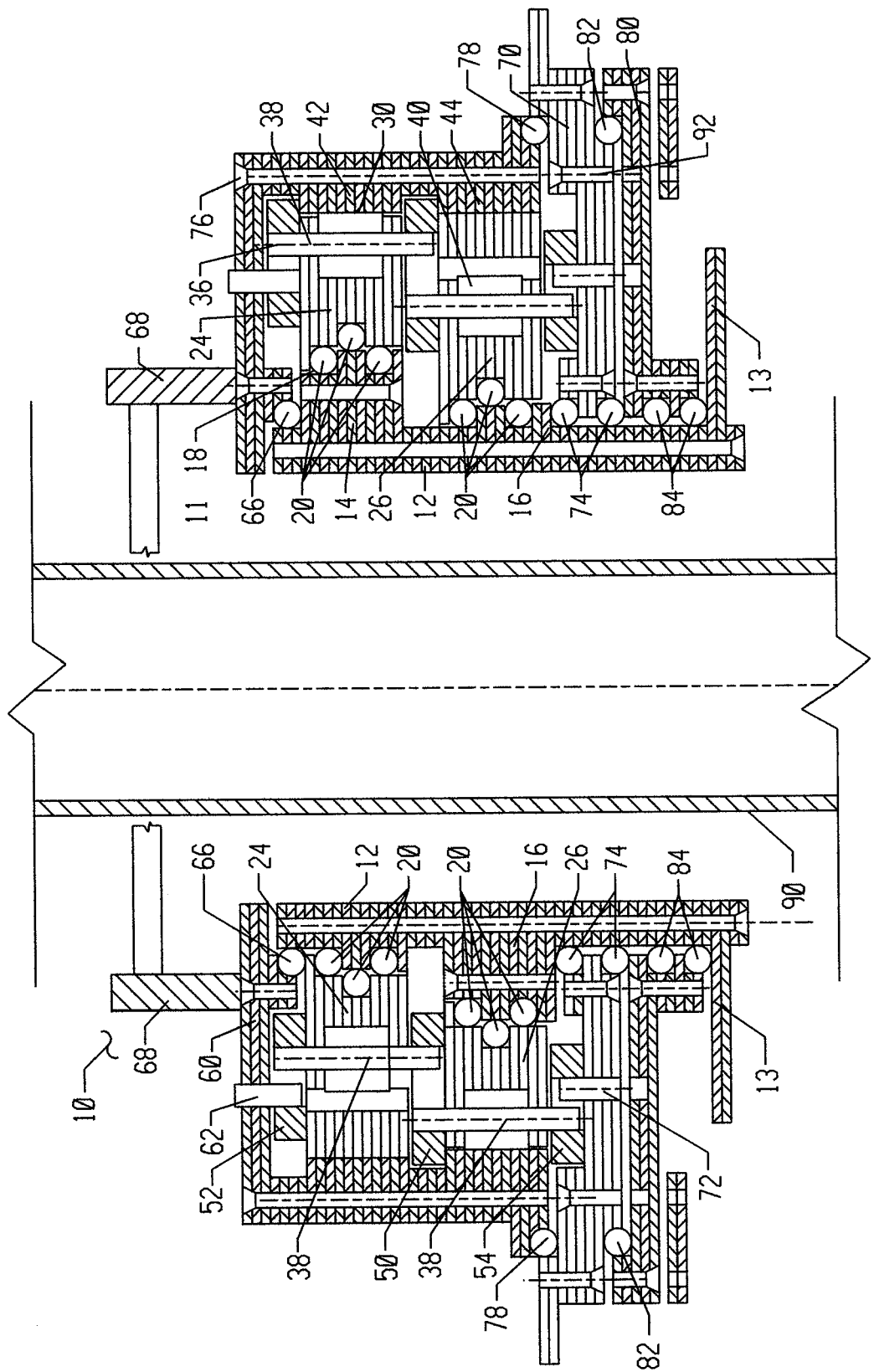
FIG. 1 is a cross sectional view of the device of the present invention.

Referring to FIG. 1, the device for varying the torque about a central member of the present invention is generally referred to as device 10. In the preferred embodiment, the primary components of the device are laminated. That is, each component is comprised of a series of relatively thin pieces of source material. These pieces are cut individually and then sandwiched together to form the final primary components. Production by way of lamination greatly reduces production costs and increases production speed. Specifically, it is much easier and cheaper to cut several thin pieces and fit them together, rather than cutting a single thick piece to form a single component.

As best seen in FIG. 1, apparatus 10 contains input component 12. In the preferred embodiment, input component 12 is a shaft. Input component 12 is characterized by a radial aperture 11, defined by the inner circumference of input component 12. During operation a central member 90 is received by device 10 through aperture 11, the central member 90 is "run through" aperture 11 as it traverses device 10. Input component 12 also contains radial flange 13. In the preferred embodiment, flange 13 mates with some outside driving force, such as a drive belt. As the external driving force causes flange 13 to rotate, input component 12 is forced to rotate with the same velocity.

Input component 12 is further characterized by a pair of eccentric lobes, eccentric lobe 14 and eccentric lobe 16. Each lobe is axially aligned with input component 12, but centrally offset from input component 12. Specifically, lobes 14 and 16 are configured so that lobe 14 is offset from input component 12 in one direction, and lobe 16 is offset from input component 12 by the same amount, in the diametrically opposite direction. Input component 12, in combination with eccentric lobes 14 and 16 form the generic shape of a camshaft. In the preferred embodiment, input component 12 contains only two eccentric lobes. However, other embodiments of the present invention are envisioned where three or more eccentric lobes are configured with respect to input component 12 to allow multiple stage reductions between input and output rotation velocity. Because speed reduction occurs by operation of stacked plates eccentrically engaging an output disc, multiple reductions can be achieved without a substantial increase in size of the device.

As best seen in FIG. 1, eccentric lobe 14 and eccentric lobe 16 each contain eccentric lobe bearing grooves 18. Eccentric lobe bearing grooves 18 are sized to allow eccentric lobe bearings 20 to remain embedded along the outer circumference of eccentric lobes 14 & 16, and freely rotate within grooves 18. As mentioned, other embodiments are envisioned where input component 12 contains three or more eccentric lobes, which would allow for three or more sets of bearings grooves 18. Again, such embodiments are thought to be particularly useful for multiple-speed reductions between the input and the output.

Referring principally to FIG. 1, driver disc 24 and driver disc 26 are of a general circular disc shape, and surround input component 12 whereby driver disc 24 is aligned with eccentric lobe 14, and driver disc 26 is aligned with eccentric lobe 16. Driver disc 24 and driver disc 26 are spaced from eccentric lobe 14 and eccentric lobe 16, respectively, such that eccentric lobe bearings 20, seated in grooves 18, fit between each driver disc and each eccentric lobe. Eccentric lobe bearings 20 allow input component 12 to rotate within each driver disc, while each driver disc remains centrally aligned with respect to its corresponding eccentric lobe. Along their outer circumference, driver disc 24 and driver disc 26 receive output ring 42 and output ring 44, respectively, and are engaged with such through engagement means 30.

As input component 12 rotates, and variable member 70 is held fixed with respect to ground member 80 via ground attachment 92 (which may be any number of devices known in the art including, but not limited to pins, screws, or clamps), each driver disc (24,26) sweeps out eccentric circles having a radius equal to the sum of the radius of disc (24,26), the radius of input component 12, and the eccentricity of corresponding lobe (14,16). As driver disc 24 and driver disc 26 rotate about input member 12 in eccentric fashion, each engages output ring 42 and output ring 44, respectively, at diametrically opposite points via engagement means 30. By virtue of the eccentric rotation of driver disc 24 and driver disc 26, engagement means 30 engages and "pushes" output ring 42 and output ring 44, respectively, in the same rotational direction as input component 12, albeit at a reduced rotational velocity. Importantly, each output ring (42,44) remains axially, centrally aligned with respect to input component 12 during operation.

In the preferred embodiment, engagement means 30 consists of a series of semicircular grooves and protrusions uniformly spaced along each driver disc (24,26) outer circumference. These grooves and protrusions are alternatingly arranged around each disc in groove-protrusion, groove-protrusion fashion. Engagement means 30 further consists of protrusion apertures, dowels 38, and rollers 40. Dowels 38 are inserted through the protrusion apertures. Dowels 38 serve to centrally align rollers 40 and the protrusions. Rollers 40 are fitted between the protrusions, and are held in alignment with the protrusion as they rotate about dowel 38. There are several advantages associated with using rollers 40. For instance, during operation, several rollers 40 are simultaneously in contact with output rings 42 and 44. As such, the strength of device 10 is increased as any impact loading is distributed evenly among all of rollers 40 in contact with output rings 42 and 44. Moreover, by virtue of the sinusoidal configuration of the protrusions and grooves, and the "sweeping motion" of driver discs 24 and 26, each roller 40 undergoes minimal rotation during engagement with output rings 42 and 44. This reduces operating friction and increases working life of component pieces. Other useful alternative embodiments are thought to incorporate different engagement means 30. For example, engagement means 30 could be a series of engagement dowels along driver disc 24 and driver disc 26 outer circumferences, embedded so that a half-circumference of each dowel is contained within each driver disc (24,26) and the other half-circumference protrudes from driver disc (24,26) in half-circle fashion. Similar to the preferred embodiment, these engagement dowels engage or "grab" output rings 42 and 44 as driver discs 24 and 26 rotate.

Figure 2:
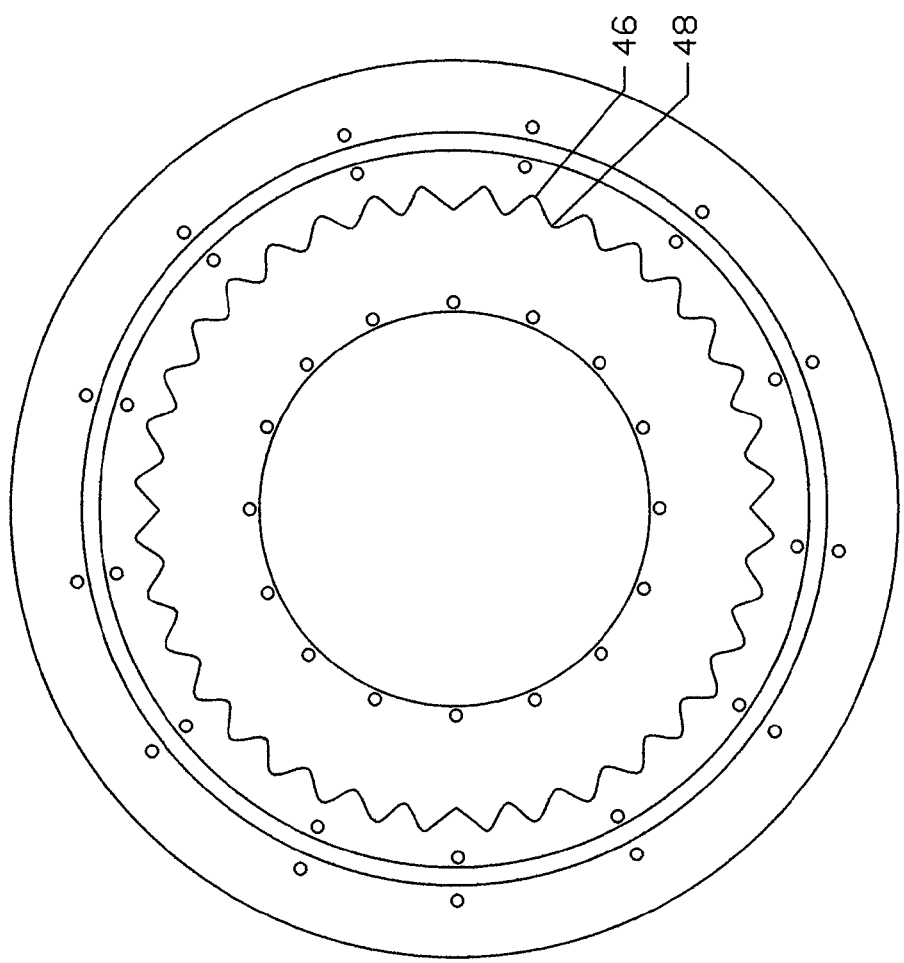
FIG. 2 is a top plain view of the device of the present invention.

As best seen in FIGS. 1 and 2, in the preferred embodiment, each roller 40 fits within protrusion and is primarily responsible for reversibly engaging with output ring 42 and output ring 44. Output ring 42 and output ring 44 each contain, along their inner circumference, a series of uniformly spaced sinusoidal grooves 46 and protrusions 48. Grooves 46 and protrusions 48 are alternatingly arranged around the inner circumference of each ring (42,44) in groove-protrusion, groove-protrusion fashion and are configured to alternatingly engage with rollers 40 as each disc (24,26) is swept about each output ring (42,44) inner circumference.

In the preferred embodiment, referring to FIG. 1, driver disc 24 and driver disc 26 interface with one another through a series of radially aligned inner rings 50. Each ring 50 is effectively sandwiched between driver disc 24 and driver disc 26, and is positioned to receive one dowel 38 from each driver disc (24,26). Ring 50 receives dowels 38 such that a dowel 38 from disc 24 and disc 26 are contained within ring 50, at diametrically opposite positions. As driver discs 24 and 26 undergo their eccentric motion, each dowel 38 rolls along the inner circumference of ring 50. As such, driver disc 24 and driver disc 26 rotate in constant relation to one another, and are engaged with one another in a low-friction environment. In the preferred embodiment, the diameter of each ring 50 is equal to the diameter of a dowel 38 and twice the lobe (14,16) eccentricity. Such an arrangement allows for each driver disc (24,26) to rotate about input component 12 in eccentric fashion, while having their respective center points offset by twice the lobe (14,16) eccentricity, and remain engaged with one another. In the preferred embodiment, there is only one set of inner rings 50: however, other embodiments are envisioned where two or more sets of inner rings 50 are sandwiched between three or more driver discs (24,26). Moreover, in the preferred embodiment, the inner circumference of ring 50 is grooved and the distal portions of dowel 38 are ball-shaped. As best seen in FIG. 1, this configuration allows discs 24 and 26 to rotate, on either side of ring 50, without surface contact between the components. Rather, dowel 38 fits within the groove of ring 50 so as to prevent any surface-to-surface friction among disc 24, disc 26, and ring 50.

In an alternative embodiment, disc 24 and disc 26 may interface through different means. For example, other embodiments are envisioned where driver disc 24 and driver disc 26 each contain inner bearing slots, to receive and hold a series of radially aligned bearings. Approximately one half of each bearing would be contained within each driver disc (24,26). As each driver disc (24,26) contains one half of each bearing therein, each driver disc (24,26) is engaged with the other in a low-friction environment. In such case the diameter of each bearing slot is equal to the diameter of each bearing and twice the eccentricity of lobes 14 and 16. Such an arrangement allows for each driver disc (24,26) to rotate about input component 12 in eccentric fashion, while having their respective center points offset by twice the eccentricity of each lobe (14,16), and remain engaged with one another.

Referring again to FIG. 1, driver disc 24 interfaces with top surface plate 60 through a series of radially aligned top rings 52. Each ring 52 is effectively sandwiched between driver disc 24 and plate 60, and is positioned to receive a dowel 38 from driver disc 24 and a top plate dowel 62 from plate 60. Each ring 52 receives a dowel 38 and a dowel 62 such that each is contained within each ring 52, at diametrically opposite positions. As driver disc 24 undergoes its eccentric motion, each dowel 38 and dowel 62 rolls along the inner circumference of ring 52. In the preferred embodiment, the diameter of each ring 52 is equal to the diameter of a dowel 38 and lobe 14 eccentricity. Such an arrangement allows for driver disc 24 to rotate about input component 12 in eccentric fashion, while having its respective center points offset by lobe 14 eccentricity, and remain engaged with top surface plate 60. In the preferred embodiment, the inner circumference of ring 52 is grooved, and the distal portions of dowel 38 and dowel 62 are ball-shaped. As best seen in FIG. 1, this configuration allows disc 24 and plate 60 to rotate without surface contact between components. Rather, dowel 38 and dowel 62 fit within the groove or ring 52 50 as to prevent any surface-to-surface friction among disc 24, top plate 60, and ring 52. Other useful embodiments are envisioned where disc 24 contains top bearing slots to receive a series of radially aligned top bearings such that one half of the diameter of the top bearings are contained within disc 24 and the other half of the top bearings are contained in corresponding top surface plate 60 bearing slots. These bearing slots are of half-spherical form, and have a diameter equal to the diameter of the top bearings and the eccentricity of lobe 14. This arrangement would also allow disc 24 to rotate about input component 12 in eccentric fashion, while remaining engaged with top surface plate 60.

As best seen in FIG. 1, top surface plate 60 is positioned on top of device 10. In the preferred embodiment, top plate 60 effectively aligns with and covers the component pieces of device 10. Top surface plate 60 is supported by its engagement with top rings 52 through dowels 62, and top surface bearings 66, positioned between input component 12 and top plate 60. Top plate 60 is of general circular disc shape and is configured for receiving and engaging with a clamping means (not pictured). Specifically, in the preferred embodiment, top plate 60 contains central engagement means 68. In the preferred embodiment, central engagement means 68 consists of a series of radially aligned pins, extending perpendicularly from top plate 60, upon which clamping means 94 may reversibly engage. However, central engagement means 68 may be any suitable mechanism for attaching and securing clamping means 94 upon top plate 60. Clamping means 94 is meant to engage central member 90 contained in aperture 11, and hold central member 90 fixed with respect to clamping means 94 itself. As a result, as output rings 42 and 44, and top plate 60 rotate with reduced speed and increased torque, so does central member 90, fixed to central engagement means 68 by way of clamping means 94.

Top plate 60 further contains a series of radially aligned fastening means 76, inserted through top plate 60, output ring 42, and output ring 44. Fastening means 76 holds top plate 60, output ring 42, and output ring 44 in radial alignment with one another. Accordingly, top plate 60 and output rings 42 and 44 all share the same rotational velocity. In the preferred embodiment, fastening means 76 may be pins, screws, or any suitable mechanism to align said top plate 60 and hold it centrally, axially fixed with respect to output ring 42 and output ring 44.

Referring again to FIG. 1, driver disc 26 interfaces with variable member 70 through a series of radially aligned rings 54. Each ring 54 is effectively sandwiched between driver disc 26 and variable member 70, and is positioned to receive a dowel 38 from driver disc 26 and a variable member dowel 72 from member 70. Each ring 54 receives a dowel 38 and a dowel 72 such that each is contained within each ring 54, at diametrically opposite positions. As driver disc 26 undergoes its eccentric motion, each dowel 38 and dowel 72 rolls along the inner circumference of ring 54. In the preferred embodiment, the diameter of each ring 54 is equal to the diameter of a dowel 38 and lobe 16 eccentricity. Such an arrangement allows for driver disc 26 to rotate about input component 12 in eccentric fashion, while having its respective center point offset by lobe 16 eccentricity, and remain engaged with variable member 70. In the preferred embodiment, the inner circumference of ring 54 is grooved, and the distal portions of dowel 38 and dowel 72 are ball-shaped. As best seen in FIG. 1, this configuration allows disc 26 to rotate without surface contact between components. Rather dowel 38 and dowel 72 fit within the groove of ring 54 so as to prevent any surface-to-surface friction among disc 26, variable member 70, and ring 54.

Other useful embodiments are envisioned where disc 26 contains bottom bearing slots to receive a series of radially aligned bottom bearings, such that one half of the diameter of the top bearings are contained within disc 26 and the other half of the top bearings are contained in corresponding variable member 70 bearing slots. These bearing slots are of half-spherical form, and have a diameter equal to the diameter of the bottom bearings and the eccentricity of lobe 16. This arrangement would also allow disc 26 to rotate about input component 12 in eccentric fashion, while remaining engaged with variable member 70.

Variable member 70 is engaged with input component 12 through bearings 74, and is engaged with output ring 44 through bearings 78. Configuration of bearings 74 and 78 allow variable member 70 to freely rotate with respect to input component 12 and output ring 44. If variable member 70 is not restrained, but allowed to freely rotate with input component 12, each component (other than ground plate 80) is allowed to rotate with input component 12 in one-to-one fashion. However, if variable member 70 is grounded or held fixed to ground plate 80 (via around attachment 92), driver discs 24 and 26, and likewise output components rings 42 and 44, top surface 60 and central member 90 all rotate with increased torque. This torque increase begins as rings 54 are held rotationally fixed. In such case, driver disc 26 is only free to rotate within the radius of ring 54. As such, as eccentric lobes 14 and 16 sweep around the circumference of input component 12, driver discs 24 and 26 sweep out eccentric rings, alternatingly engaging output rings 42 and 44 via engagement means 30. This "reduction" goes hand in hand with the torque increase transferred to plate 60 and output engagement means 68, and therefore secured member segment. Finally, any number of methods may be used to vary the rotational speed of variable member 70, the most probable methods include use of standard clutch.

Ground member 80 is engaged with variable member 70, on the opposite side from drivers driver discs 24 and 26. In the preferred embodiment, ground member 80 is primarily responsible for securing device 10 with respect to its surrounding environment via some means as known in the art such as pins, screws, or welding. Ground member 80 is engaged with input component 12 through bearings 84, and is engaged with variable member 70 through bearings 82. Configuration of bearings 82 and 84 allow input component 12 and variable member 70 to freely rotate with respect to ground member 80.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A torque varying device, comprising:
  an input component, where said input component has an aperture configured to allow insertion of a central member therethrough;
  a lobe member, said lobe member being attached to said input component, said lobe member being axially aligned with said input component but centrally offset from said input component;
  a driver disc, said driver disc being engaged with said input component through said lobe member via a rolling mechanism, wherein said driver disc is centrally, axially aligned about said lobe member, where said driver disc moves about said input component in eccentric fashion, responding to rotational force of said input component via said lobe member and said rolling mechanism; and
  an engagement means, wherein said engagement means is located along the periphery of said driver disc and alternatingly engages an output component as said driver disc eccentrically moves about said input member, said output component being configured to alternately receive said engagement means, and to rotate about said driver disc and said input component.

2. The device of claim 1, further comprising a variable member engaged with said driver disc, said variable member configured to rotate about said input component.

3. The device of claim 2, further comprising a ground member positioned to remain fixed with respect to the surrounding environment and maintain said device in a stable position, while allowing said input component, said driver disc, said engagement means, said output component, and said variable member to freely rotate with respect to said ground member.

4. The device of claim 3 wherein said ground member is further configured to engage said variable member and constrain said variable member from rotation about said input member.

5. The device of claim 4, wherein said engagement means is comprised of a dowel and a roller.

6. A torque varying device, comprising:
  an input component, said input component having an aperture configured to allow insertion of a central member therethrough;
  a first lobe member, said first lobe member being attached to said input component, said lobe member being axially aligned with said input component but centrally offset from said input component;
  a second lobe member, said second lobe member being attached to said input component, said lobe member being axially aligned with said input component but centrally offset from said input component by the same amount but in the diametrically opposing direction from said first lobe member;
  a first driver disc, said first driver disc being engaged with said input component through said first lobe member via a first rolling mechanism, said driver disc being centrally and axially aligned about said first lobe member, said first driver disc being configured to move about said input component in an eccentric path being driven by the rotation of said input component via said first lobe member and said first rolling mechanism;
  a second driver disc, said second driver disc being engaged with said input component through said second lobe member via a second rolling mechanism, said second driver disc being centrally and axially aligned about said second lobe member, said second driver disc being configured to move about said input component in an eccentric path being driven by the rotation of said input component via said second lobe member and said second rolling mechanism, said second driver disc being engaged with said first driver disc such that said second driver disc moves in relation to said first driver disc;
  an engagement means, wherein said engagement means is located along the periphery of each driver disc and alternatingly engages an output component as each driver disc eccentrically moves about said input component said output component being configured to alternately receive said engagement means and to rotate about said driver discs and said input component.

7. The device of claim 6, further comprising a variable member, said variable member being engaged with said second driver disc, said variable member being configured to rotate about said input component.

8. The device of claim 7, further comprising a ground member, said ground member being constrained from rotation, said ground member being configured to allow said input component, said first and second driver discs, said engagement means, said output component, and said variable member to freely rotate with respect to said ground member.

9. The device of claim 8 wherein said ground member is configured to engage said variable member and constrain said variable member from rotation about said input member.

10. The device of claim 9 wherein said engagement means is comprised of a dowel and a roller.

11. The device of claim 10 wherein said first driver disc is engaged with said second driver disc through a combination of dowels and rings.

* * * * *